(12) United States Patent  (10) Patent No.: US 8,102,648 B2
Bhutani  (45) Date of Patent: Jan. 24, 2012

(54) DRIVE BEZEL CONNECTOR COUPLINGS

(75) Inventor: Gurmeet Singh Bhutani, Punjab (IN)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 12/481,262

(22) Filed: Jun. 9, 2009

(65) Prior Publication Data

US 2010/0309620 A1  Dec. 9, 2010

(51) Int. Cl.
*G06F 1/16* (2006.01)

(52) U.S. Cl. ............ 361/679.33; 360/97.01; 439/541.5; 312/223.2

(58) Field of Classification Search ............ 361/679.08, 361/679.32, 679.33, 679.31, 679.48; 360/245.1, 360/97.01, 97.02, 94; 439/74, 541.5; 312/223.1, 312/223.2
See application file for complete search history.

(56) References Cited

U.S. PATENT DOCUMENTS

| 5,199,888 | A | 4/1993 | Condra et al. |
| 6,621,691 | B2 * | 9/2003 | Howell .................... 361/679.33 |
| 6,910,218 | B2 | 6/2005 | Park et al. |
| 7,561,935 | B2 * | 7/2009 | Chung ........................... 700/94 |
| 7,639,491 | B2 * | 12/2009 | Mundt et al. ............ 361/679.37 |
| 2007/0091504 | A1 | 4/2007 | Ulrich |
| 2008/0174951 | A1 * | 7/2008 | Mundt et al. .................. 361/686 |
| 2011/0080705 | A1 * | 4/2011 | Figuerado et al. ....... 361/679.33 |

* cited by examiner

*Primary Examiner* — Hung Duong
(74) *Attorney, Agent, or Firm* — Haynes and Boone, LLP (57) ABSTRACT

An information handling system (IHS) includes an IHS chassis defining a drive bay. A processor is located in the IHS chassis. A drive chassis is located in the drive bay. A bezel extends from an edge of the drive chassis. A first connector coupling is located on the bezel. An IHS connector is located on the drive chassis and electrically coupled to the processor and the connector coupling such that a device may be coupled to the IHS through a cable connected to the first connector coupling.

20 Claims, 11 Drawing Sheets

DRIVE BEZEL CONNECTOR COUPLINGS

BACKGROUND

The present disclosure relates generally to information handling systems, and more particularly to connector couplings on an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As the trend towards smaller and lighter IHSs continues, less and less space is available on the IHS chassis for connector couplings with which to couple the IHS to other devices. For example, some portable IHSs include a display moveably coupled to a base such that a backside of the base is not available for connector couplings due to the display moving adjacent the backside of the base when the portable IHS is opened. With such IHSs, this leaves only the sides of the base for connector couplings, as any cables extending from connector couplings on the front side of the base would interfere with the user of the IHS. Furthermore, drives such as, for example, optical drives, hard disk drives, and the like, typically occupy almost 70% of the space on one side of the base, further reducing the space available for connector couplings. Due to the need to include both new generation connector couplings and previous generation connector couplings in order to allow IHS users as many coupling options as possible, this reduced amount of connector coupling space on the base of the IHS requires the IHS manufacturer to make undesirable decisions about which connector couplings to include on the IHS.

Accordingly, it would be desirable to provide a portable IHS with connector couplings absent the disadvantages discussed above.

SUMMARY

According to one embodiment, an IHS includes an IHS chassis defining a drive bay, a processor located in the IHS chassis, a drive chassis located in the drive bay, a bezel extending from an edge of the drive chassis, a first connector coupling located on the bezel, and an IHS connector located on the drive chassis and electrically coupled to the processor and the connector coupling.

BRIEF DESCRIPTION OF THE DRAWINGS

FIG. 3b is a bottom view illustrating an embodiment of the drive chassis of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
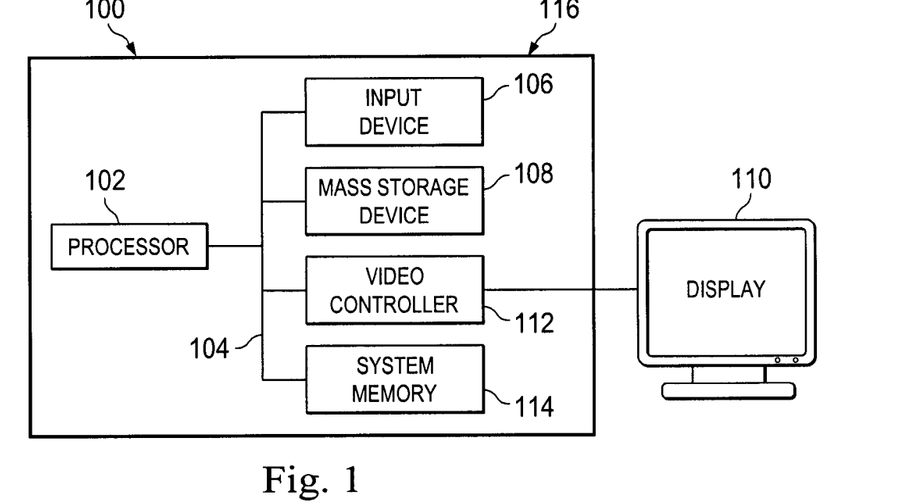
FIG. 1 is a schematic view illustrating an exemplary embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
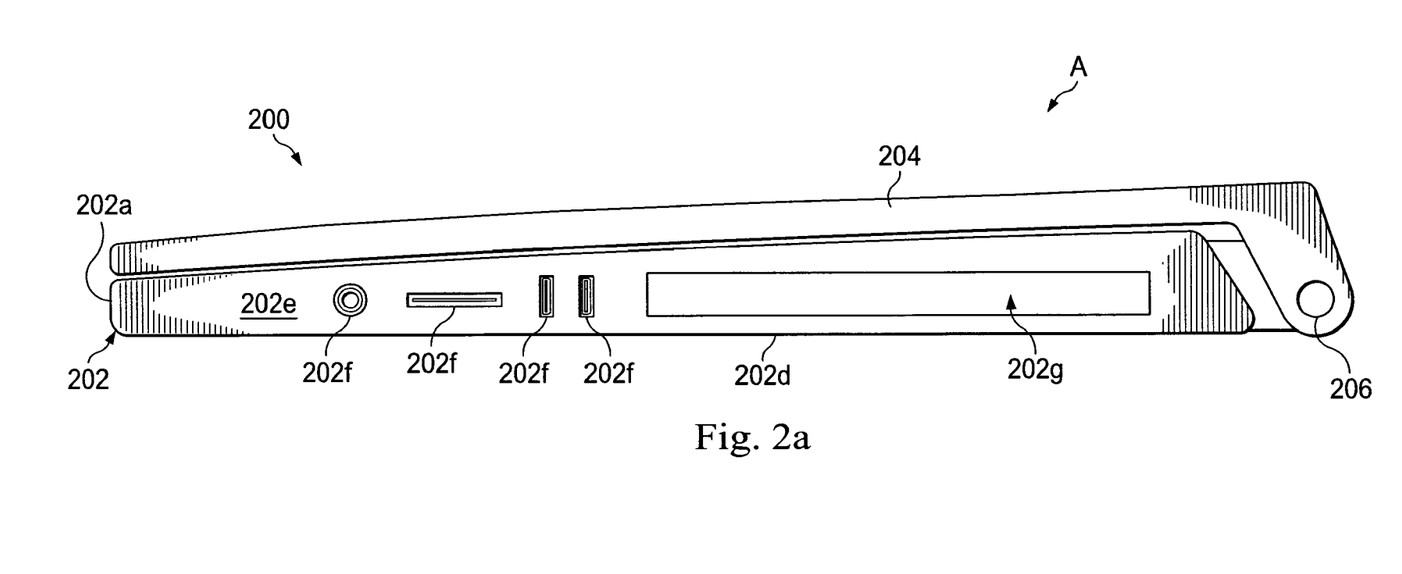
FIG. 2a is a side view illustrating an embodiment of an IHS chassis with a display portion in a closed position.
Figure 2B:
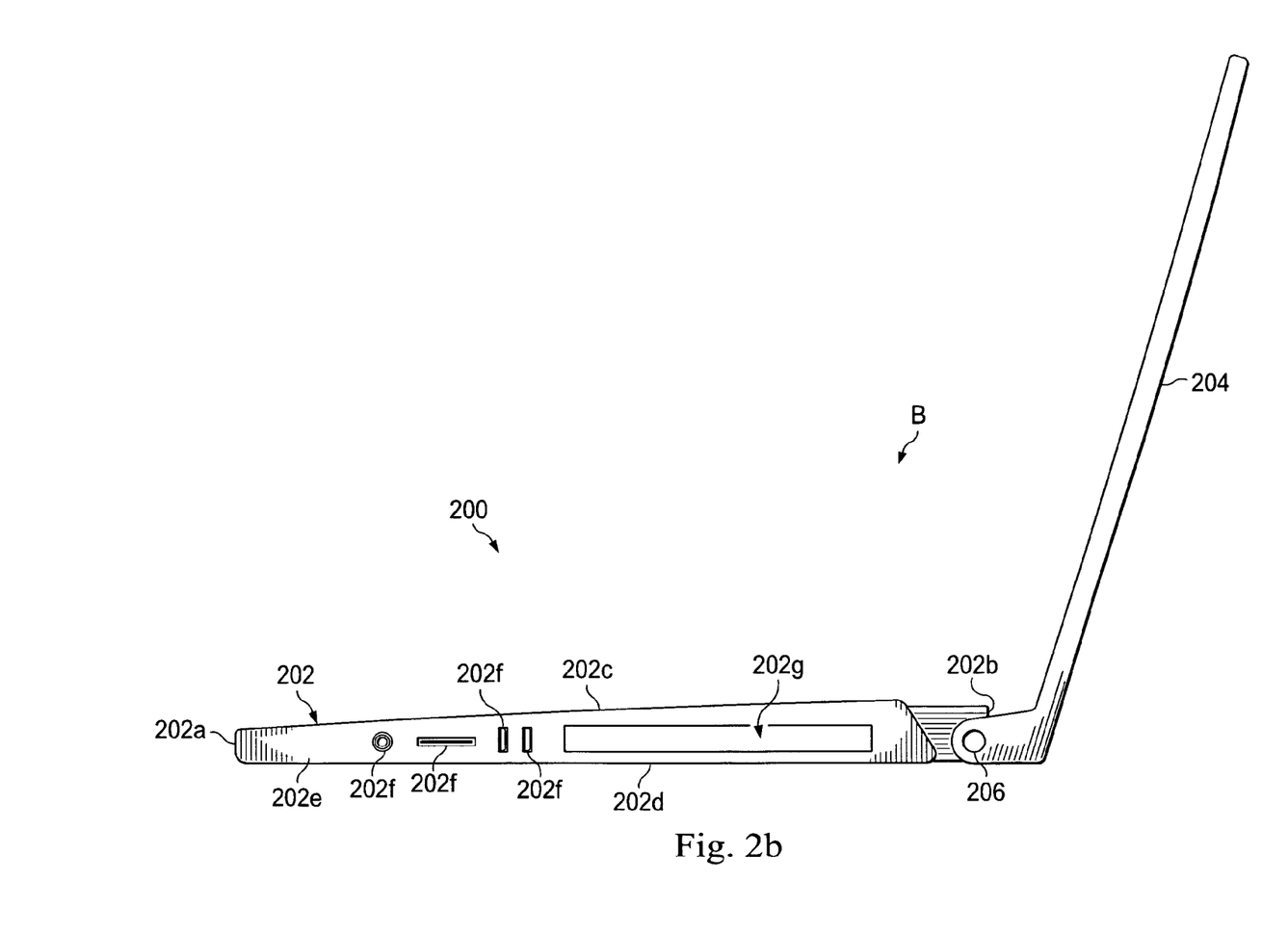
FIG. 2b is a side view illustrating an embodiment of the IHS chassis of FIG. 2a with the display portion in an open position.

Referring now to FIGS. 2a and 2b, an IHS chassis 200 is illustrated that may be the chassis 116, described above with reference to FIG. 1, and may include some or all of the components of the IHS 100. The IHS chassis 200 includes a base portion 202 having a front surface 202a, a rear surface 202b located opposite the front surface 202a, a top surface 202c extending between the front surface 202a and the rear surface 202b, a bottom surface 202d located opposite the top surface 202c and extending between the front surface 202a and the rear surface 202b, and a side surface 202e extending between the front surface 202a, the rear surface 202b, the top surface 202c, and the bottom surface 202d. While not visible in FIGS. 2a and 2b, an opposing side surface opposite the side surface 202e extends between the front surface 202a, the rear surface 202b, the top surface 202c, and the bottom surface 202d on the opposite side of the base portion 202 from the side surface 202e. The base portion 202 also includes a plurality of connector couplings 202f located on the side surface 202e, and defines a drive bay 202g that extends from the side surface 202e and into the IHS chassis 202. The IHS chassis 200 also includes a display portion 204 that is moveably coupled to the base portion 202 by, for example, a rotatable coupling 206 that extends between the side surface 202e and the display 206 (and between the side surface (that opposes the side surface 202e on the base portion 202) and the display portion 204, not illustrated). The rotatable coupling 206 allows the display portion 204 to be moved relative to the base portion 202 from a closed orientation A, illustrated in FIG. 2a, to an open orientation B, illustrated in FIG. 2b. As can been seen in FIGS. 2a and 2b, when the display portion 204 is moved relative to the base portion 202 from the closed orientation A to the open orientation B, the display portion 204 moves adjacent the rear surface 202b of the base portion 202. Due to the display portion 204 moving adjacent to the rear surface 202b of the base portion 202, connector couplings cannot be located on the rear surface 202b as connectors coupled to them would interfere with the moving of the display portion 204 relative to the base portion 202 from the closed orientation A to the open orientation B.

Figure 3A:
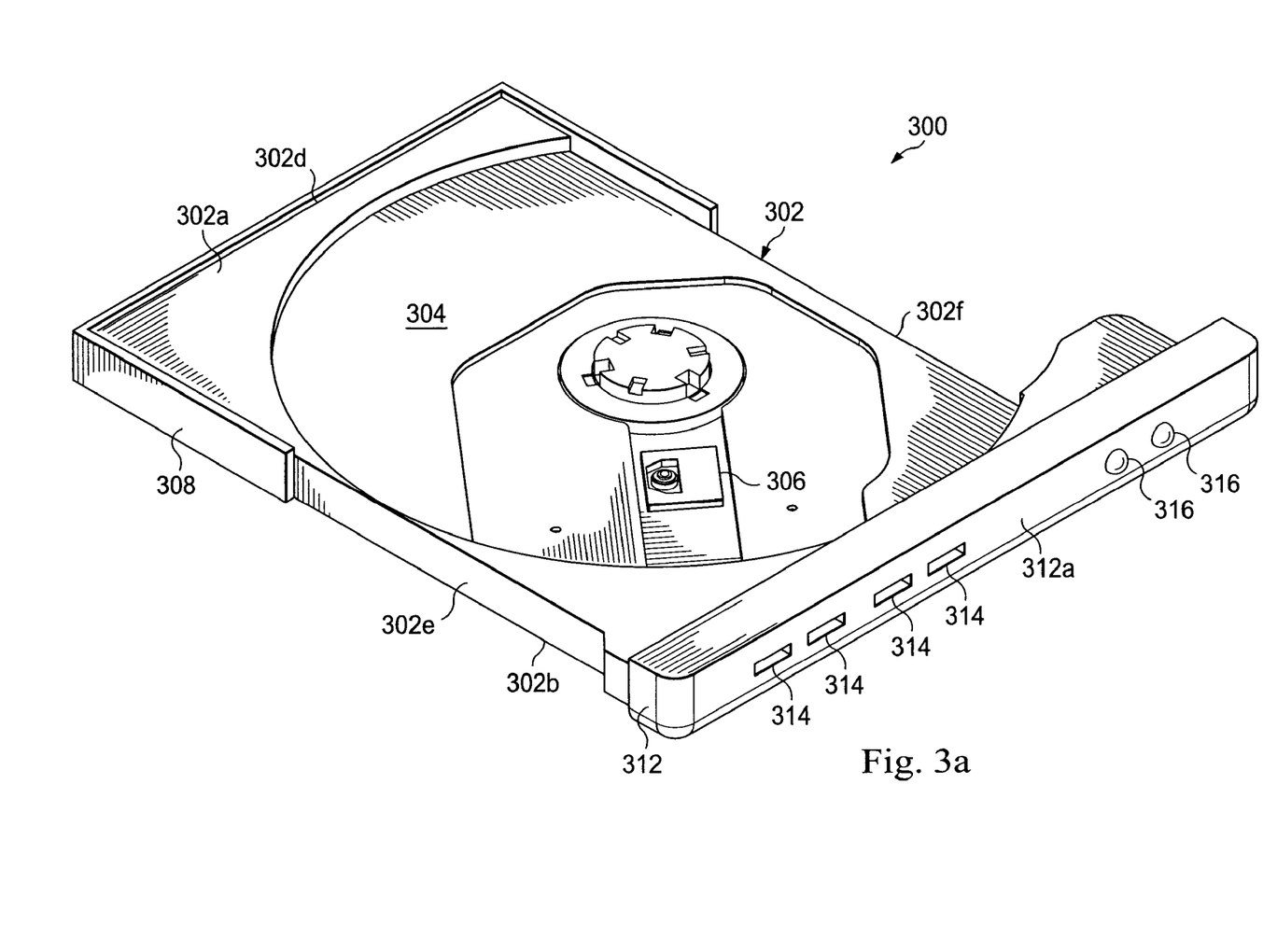
FIG. 3a is a perspective view illustrating an embodiment of a drive chassis.
Figure 3B:
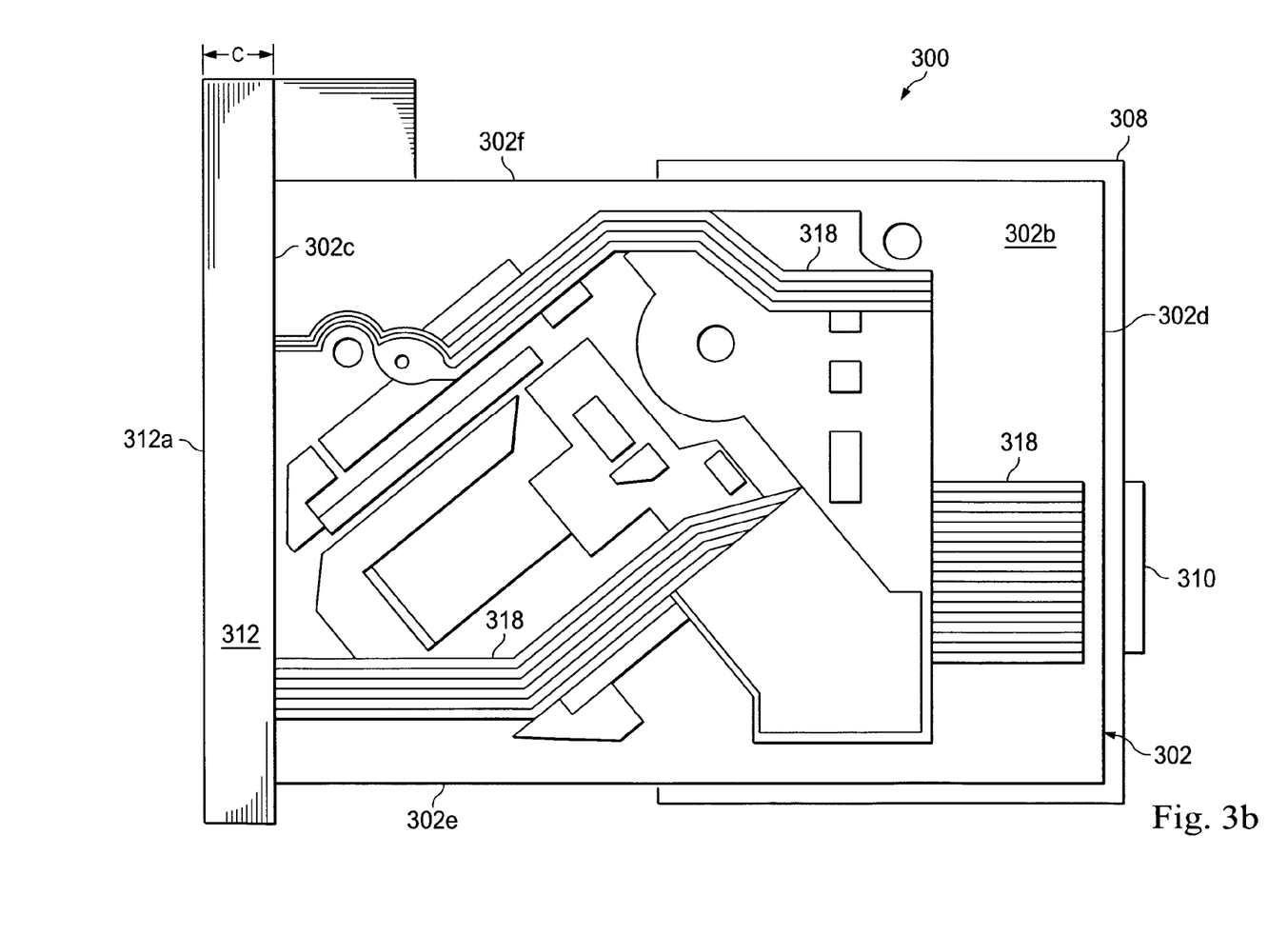

Referring now to FIGS. 3a and 3b, a drive 300 is illustrated. In the illustrated embodiment, the drive 300 is an tray-load optical drive. However, a variety of other IHS components are contemplated to fall within the scope of the present disclosure such as, for example, other types of optical drives and/or hard drives. The drive 300 includes a drive chassis 302 having a top surface 302a, a bottom surface 302b located opposite the top surface 302a, a front edge 302c extending between the top surface 302a and the bottom surface 302b, a rear edge 302d located opposite the front edge 302b and extending between the top surface 302a and the bottom surface 302b, and a plurality of opposing sides edges 302e and 302f extending between the top surface 302a, the bottom surface 302b, the front edge 302c, and the rear edge 302d. An optical disc channel 304 is defined by the drive chassis 302 and extends into the drive chassis 302 from the top surface 302a. A disc reading mechanism 306 is located in the drive chassis 302 adjacent the disc channel 304. A tray-load mechanism 308 is moveably coupled to the drive chassis 302 and located adjacent the rear and side edges 302, 302e and 302f. An IHS connector 310 extends from the drive chassis 302 and/or the tray-load mechanism 308 adjacent the rear edge 302d. A bezel 312 including a front surface 312a extends from the front edge 302c of the drive chassis 302 and, in an embodiment, the bezel 312 includes a thickness C that is greater than the thickness of a convention bezel coupled to the front edge of a conventional drive chassis. A plurality of connector couplings 314 are located in the bezel 312 immediately adjacent the front surface 312a. In an embodiment, the connector couplings 314 include Universal Serial Bus (USB) connector couplings, High-Definition Multimedia Interface connector couplings, combinations thereof, and/or a variety of other connector couplings known in the art. In an embodiment, the connector couplings include USB connector couplings that occupy approximately 12-15 mm of the thickness C of the bezel 312. In the illustrated embodiment, the connector couplings 314 are oriented side-by-side horizontally in a single row. However, the bezel 312 may be sized to orient the connector coupling vertically side-by-side, horizontally stacked on top of each other, and/or in a variety of other orientations known in the art. A plurality of drive controls 316 are located in the bezel 312 adjacent the front surface 312a. A plurality of electrical couplings 318 extend along the bottom surface 302b of the drive chassis 302 between the bezel 312 and the IHS connector 310 to electrically couple the connector couplings 314, the drive controls 316, the disc reading mechanism 306, and/or a variety of other drive mechanisms known in the art, to the IHS connector 310. In an embodiment, an extended length of the electrical couplings 318 (not illustrated) allows the tray-load mechanism 308 to move relative to the drive chassis 302 without the electrical couplings 318 becoming detached from the IHS connector 310.

Figure 4A:
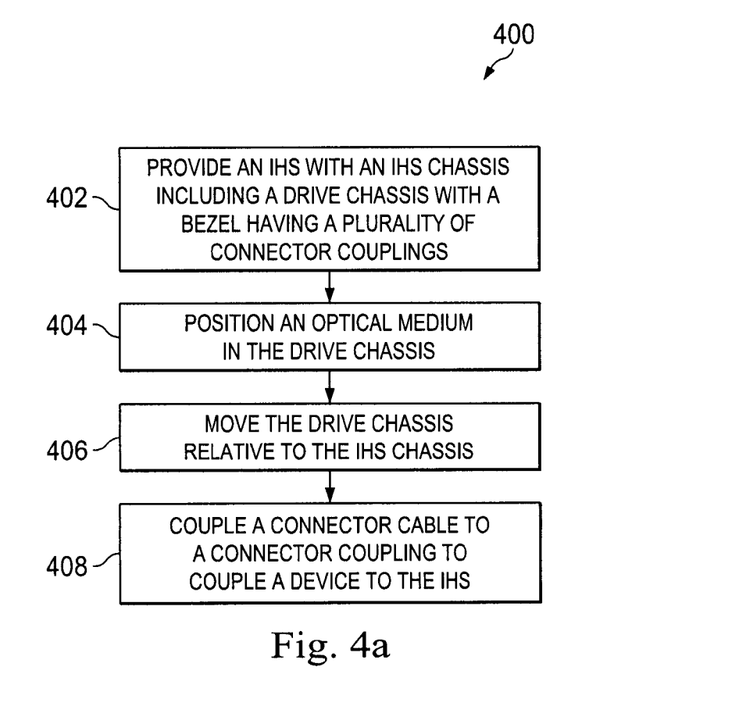
FIG. 4a is a flow chart illustrating an embodiment of a method for coupling a cable to an IHS.
Figure 4B:
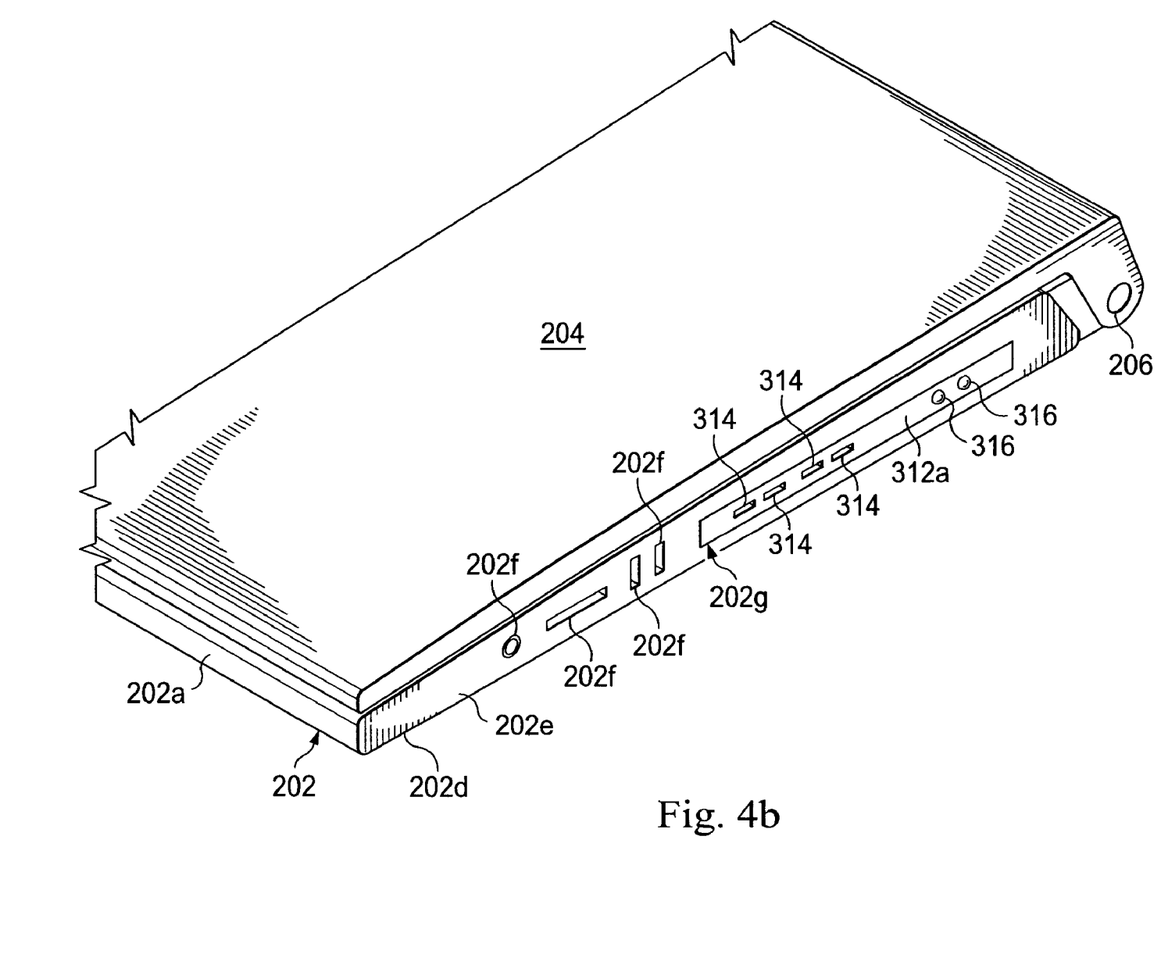
FIG. 4b is a perspective view illustrating an embodiment of the drive chassis of FIGS. 3a and 3b coupled to the IHS chassis of FIGS. 2a and 2b.
Figure 4C:
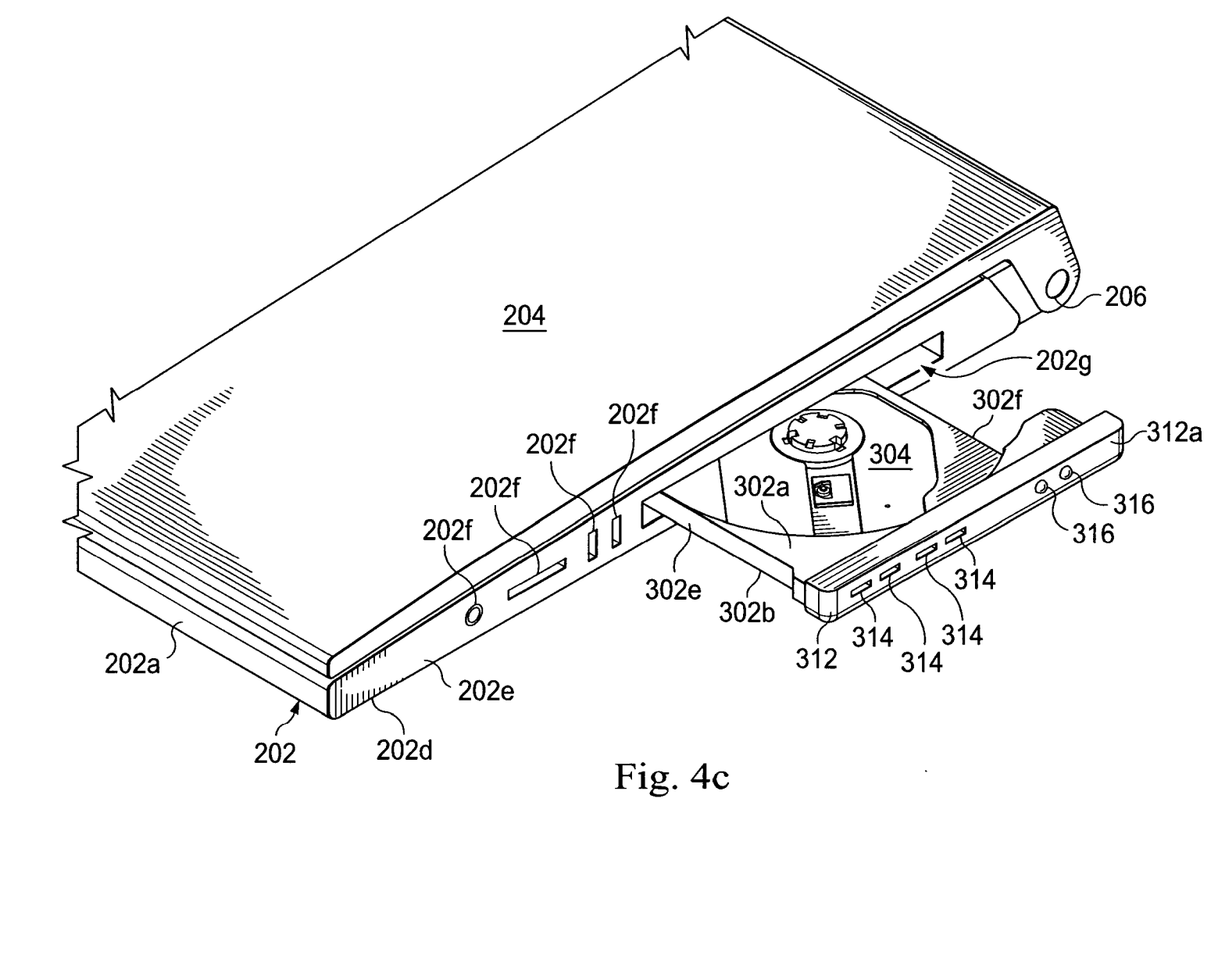
FIG. 4c is a perspective view illustrating an embodiment of the drive chassis of FIGS. 3a and 3b extended out of the IHS chassis of FIGS. 2a and 2b.

Referring now to FIGS. 2a, 2b, 3a, 3b, 4a, 4b and 4c, a method 400 for coupling a cable to an IHS is illustrated. The method 400 begins at block 402 where an IHS with an IHS chassis that includes a drive chassis with a bezel having a plurality of connector couplings is provided. In an embodiment, the IHS 200, described above with reference to FIGS. 2a and 2b, is provided. The drive chassis 300, described above with reference to FIGS. 3a and 3b, is coupled to the IHS chassis 200 by positioning the drive chassis 300 in the drive bay 202g, coupling the IHS connector 310 on the drive chassis 300 to a connector (not illustrated) housed in the IHS chassis 200, and coupling the tray-load mechanism 308 to the IHS chassis 200 in the drive bay 202g. With the tray-load mechanism 308 coupled to the IHS chassis 200, the drive chassis 302 is operable to move relative to the IHS chassis 200 such that the drive chassis 300 may be extended out of the drive bay 202g, as illustrated in FIG. 4c. With conventional optical drive chassis, the optical drive chassis is typically operable to extend out of the drive bay 202g to its full length of approximately 128 mm. However, in experimental embodiments, it has been found that an optical medium may be inserted in the disc channel 304 on the drive chassis 300 when the drive chassis 300 is extended out of the drive bay 202g only approximately 100 mm. By limiting the extendibility of the drive chassis 300 out of the drive bay 202g to approximately 100 mm, the drive chassis 300 may be mounted deeper into the IHS chassis 200 than are conventional drive chassis such that the front surface 312a of the bezel 312, which has an increased thickness relative to conventional bezels as described above, may be flush mounted with the side surface 202e of the IHS chassis 200.

Figure 4D:
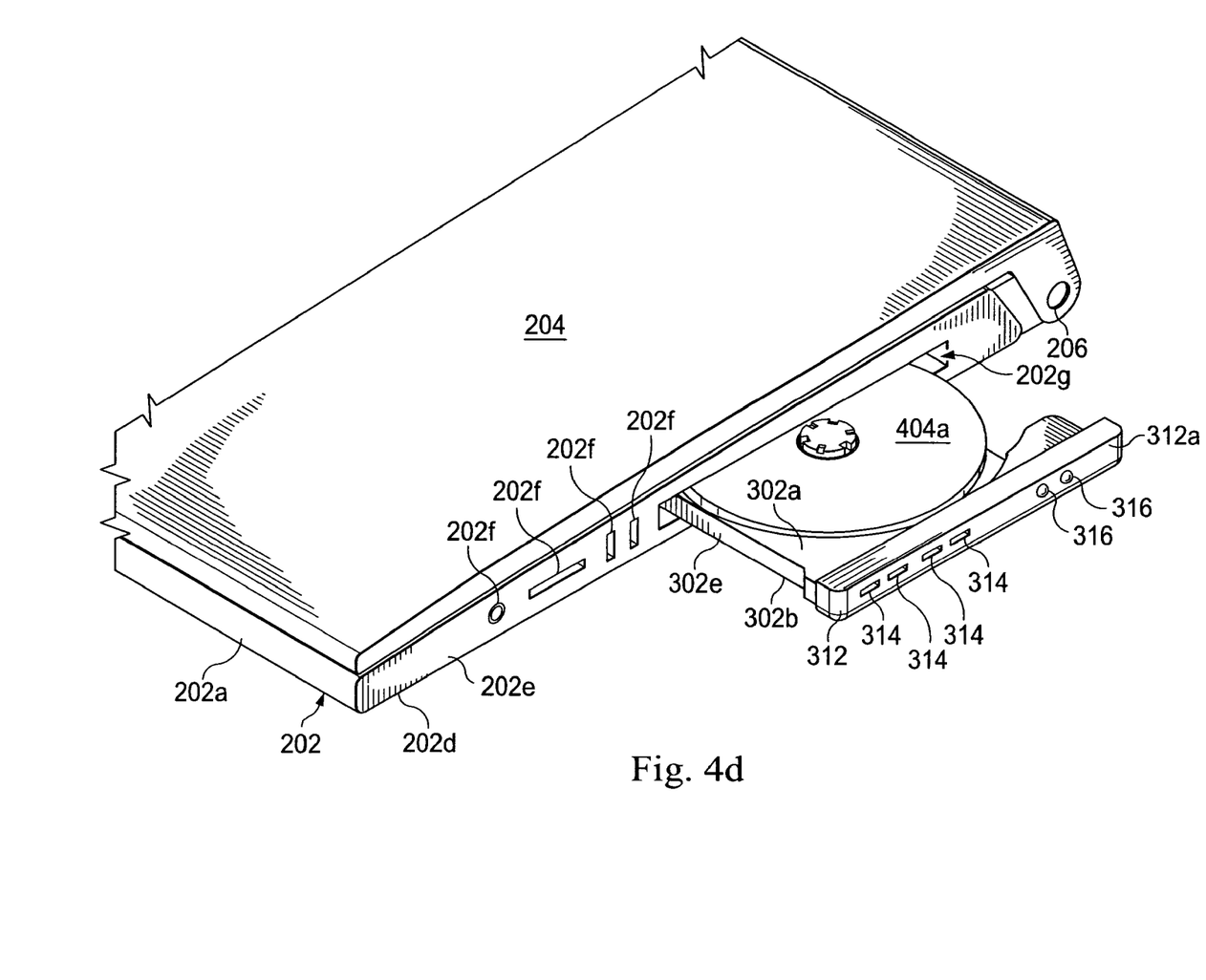
FIG. 4d is a perspective view illustrating an embodiment of an optical medium positioned in the drive chassis of FIGS. 3a and 3b that is extended out of the IHS chassis of FIGS. 2a and 2b.
Figure 4E:
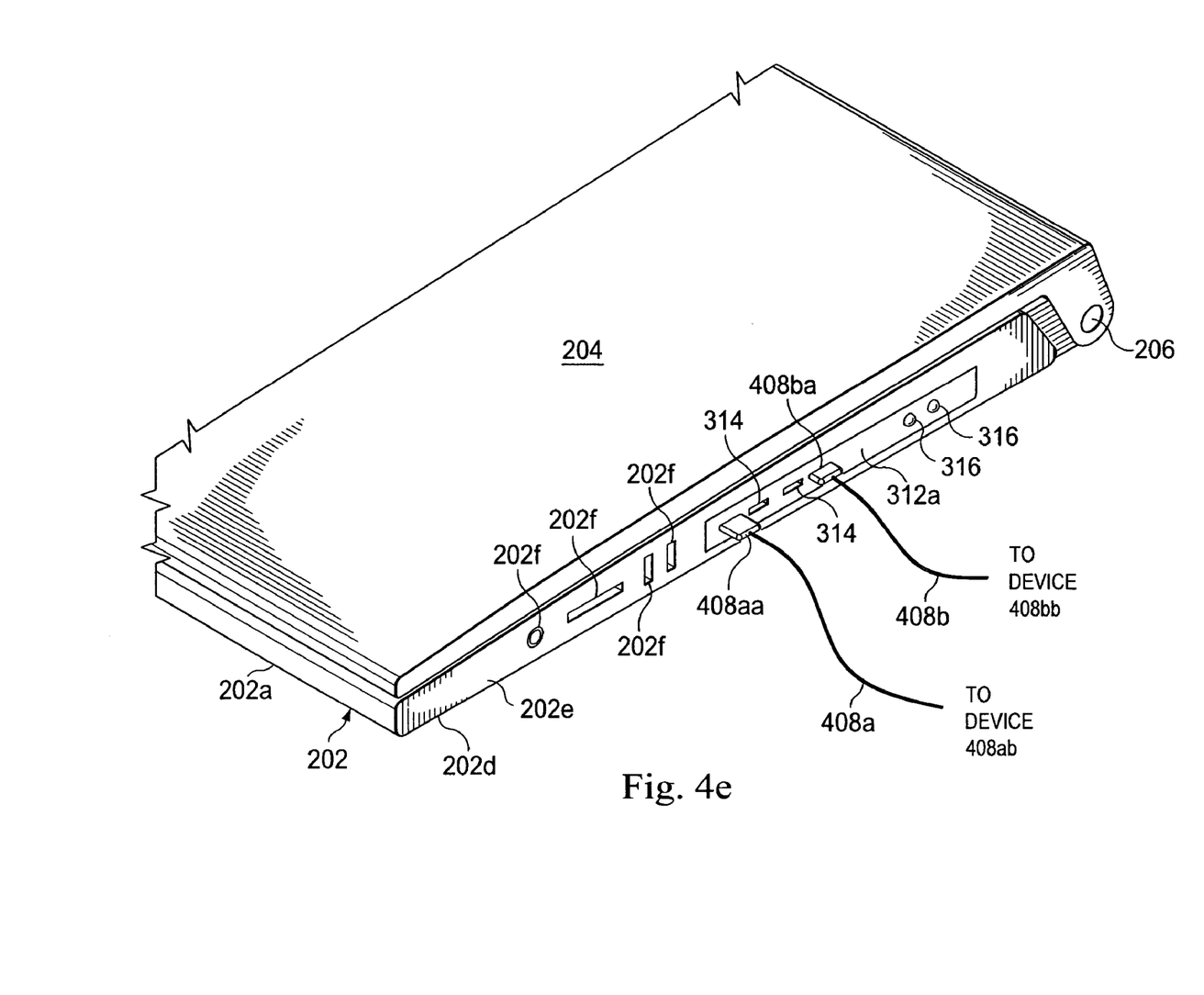
FIG. 4e is a perspective view illustrating an embodiment of a plurality of connector cables coupled to connector couplings on the drive chassis of FIGS. 3a and 3b that is coupled to IHS chassis of FIGS. 2a and 2b.

Referring now to FIGS. 2a, 2b, 3a, 3b, 4a, 4d and 4e, the method 400 the proceeds to block 404 where an optical medium is positioned in the drive chassis. An in embodiment, an optical medium 404a is positioned in the disc channel 304 defined by the drive chassis 300, as illustrated in FIG. 4d. The method 400 then proceeds to block 406 where the drive chassis is moved relative to the IHS chassis. In an embodiment, with the tray-load mechanism 308 coupled to the IHS chassis 200, the drive chassis 302 may be moved relative to the IHS chassis 200 such that the drive chassis 300 and the optical medium 404a are housed in drive bay 202g, as illustrated in FIG. 4b. In an embodiment, the drive controls 316 may be actuated by a user to, for example, eject the drive chassis 300 from the drive bay 202g (illustrated in FIG. 4d) to retrieve the optical medium 404a. The method 400 then proceeds to block 408 where a connector cable is coupled to the connector couplings to couple a device to the IHS. A plurality of connector cables 408a and 408b each including connectors 408aa and 408ba, respectively, and each coupled to devices 408ab and 408bb, respectively, are coupled to the connector couplings 314 by inserting the connectors 408aa and 408ba into the connector couplings 314, as illustrated in FIG. 4e. In an embodiment, the connectors 408aa and 408ba may be USB connectors, HDMI connectors, combinations thereof, and/or a variety of other connectors known in the art. Thus, a system and method are provided that utilize previously unused surface space on a drive chassis coupled to an IHS chassis in order to provide connector couplings for the IHS such that a variety of connector couplings can be provided on an IHS chassis that may have a limited amount of surface space.

Figure 5:
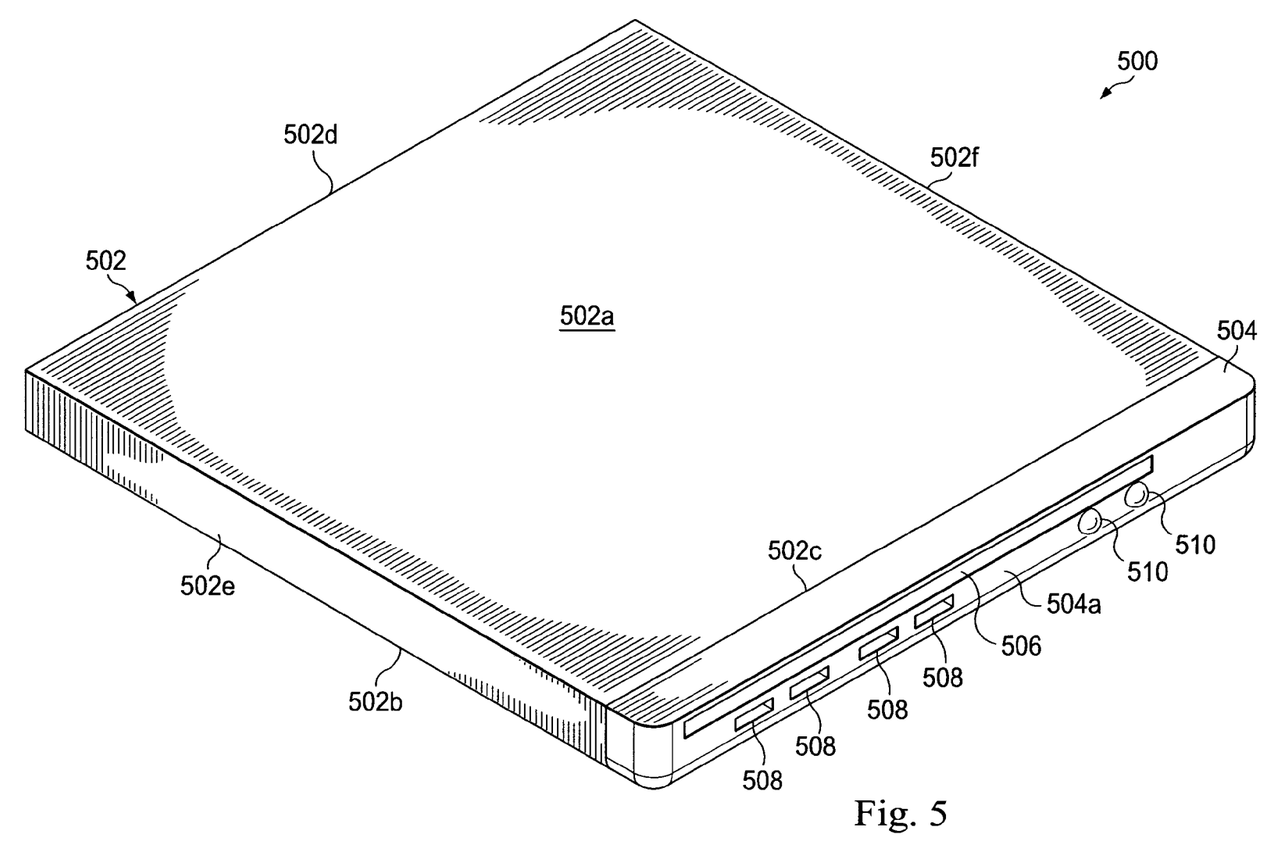
FIG. 5 is a perspective view illustrating an embodiment of a drive chassis.
Figure 6:
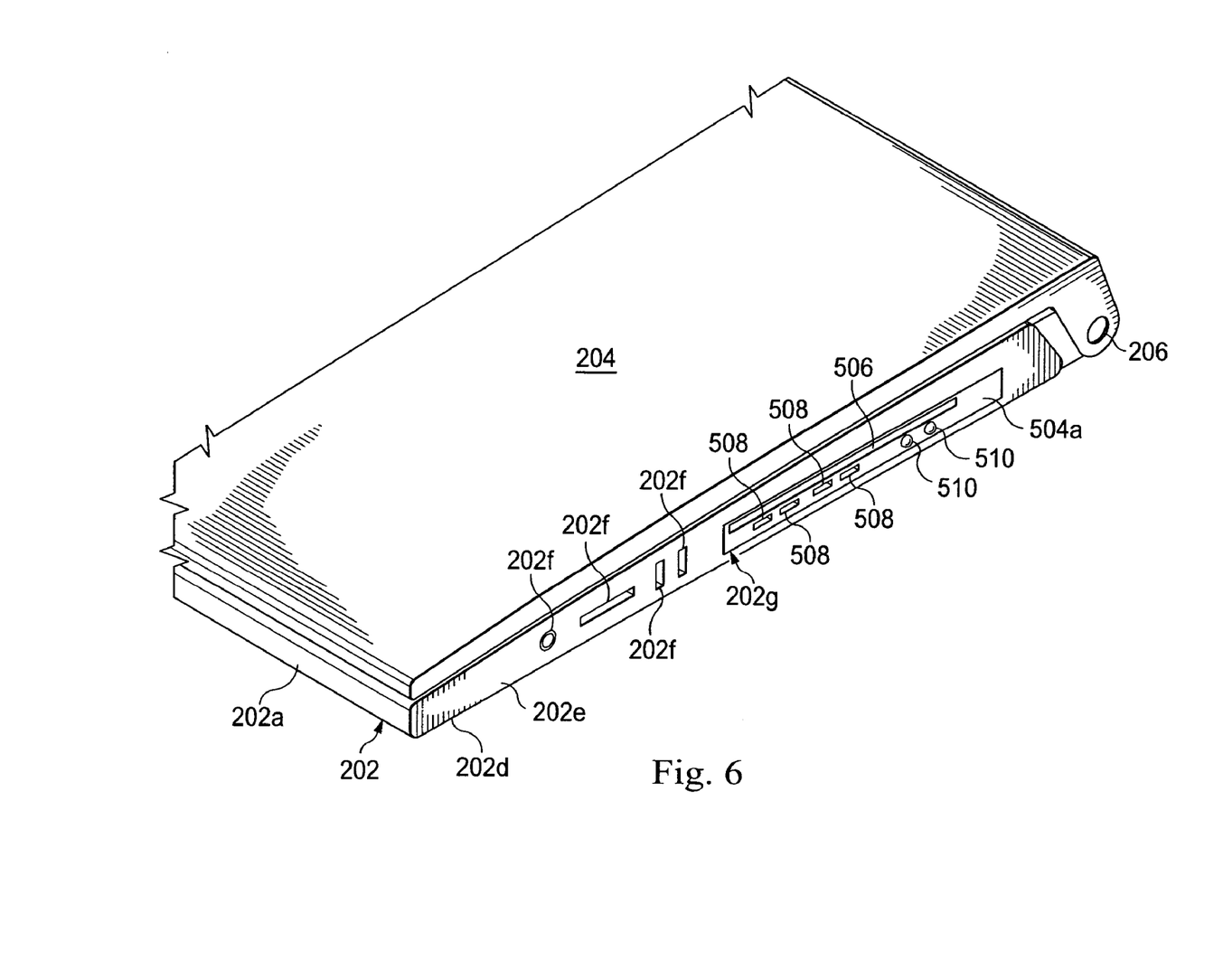
FIG. 6 is a perspective view illustrating an embodiment of the drive chassis of FIG. 5 coupled to the IHS chassis of FIGS. 2a and 2b.

Referring now to FIGS. 5 and 6, an alternative embodiment of a drive chassis 500 is illustrated. In the illustrated embodiment, the drive chassis 500 is an slot-load optical drive. The drive chassis 500 includes a drive chassis 502 having a top surface 502a, a bottom surface 502b located opposite the top surface 502a, a front edge 502c extending between the top surface 502a and the bottom surface 502b, a rear edge 502d located opposite the front edge 502b and extending between the top surface 502a and the bottom surface 502b, and a plurality of opposing sides edges 502e and 502f extending between the top surface 502a, the bottom surface 502b, the front edge 502c, and the rear edge 502d. An IHS connector (similar to the IHS connector 310 described above with reference to FIG. 3b but not visible in FIG. 5) is located on the rear edge 502d. A bezel 504 including a front surface 504a extends from the front edge 502c of the drive chassis 502. An optical disc slot 506 is defined by the bezel 504 and the drive chassis 302 and extends through the bezel 504 from the front surface 504a and into the drive chassis 502. A plurality of connector couplings 508 are located in the bezel 504 immediately adjacent the front surface 504a. In an embodiment, the connector couplings 508 include Universal Serial Bus (USB) connector couplings, High-Definition Multimedia Interface connector couplings, combinations thereof, and/or a variety of other connector couplings known in the art. A plurality of drive controls 510 are located in the bezel 504 adjacent the front surface 504a. In operation, the drive chassis 500 may be used in the method 400 described above with slight modifications. At block 402, the drive chassis 500 may be positioned in the drive bay 202g of the IHS chassis 200 and electrically coupled to the IHS through its IHS connector, as illustrated in FIG. 6. At block 404, an optical medium similar to the optical medium 404a described above, may be inserted into the optical disc slot 506. The drive chassis 500 will detect the insertion of the optical medium in the optical disc slot 506 and then mechanically position the optical medium within the drive chassis so that information on the optical medium can be read. In an embodiment, the drive controls 510 may be actuated by a user to, for example, eject the optical medium from the optical disc slot 506 in order to retrieve the optical medium. Block 406 is skipped. At block 408, a plurality of connector cables similar to the connector cables 408a and 408b described above, may be coupled to the connector couplings 508 substantially as described above for the connector couplings 314.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An optical drive, comprising:
    an optical drive chassis that is operable to be positioned in an information handling system (IHS) drive bay;
    a bezel extending from an edge of the optical drive chassis, wherein the bezel includes a bezel outer surface that is operable to be flush with an IHS outer surface located adjacent the IHS drive bay when the optical drive chassis is positioned in the IHS drive bay;
    a first connector coupling located on the bezel and accessible from the bezel outer surface; and
    an IHS connector located on the optical drive chassis and electrically coupled to the connector coupling.

2. The optical drive of claim 1, wherein the first connector coupling comprises a Universal Serial Bus connector coupling.

3. The optical drive of claim 1, wherein the first connector coupling comprises a High-Definition Multimedia Interface connector coupling.

4. The optical drive of claim 1, further comprising:
    an optical drive control located on the bezel.

5. The optical drive of claim 1, further comprising:
    at least one second connector coupling located on the bezel and electrically coupled to the IHS connector.

6. The optical drive of claim 5, wherein the first connector coupling and the at least one second connector coupling comprises at least one Universal Serial Bus connector coupling and at least one High-Definition Multimedia Interface connector coupling.

7. An information handling system (IHS), comprising:
    an IHS chassis defining a drive bay and including an IHS outer surface defining an entrance to the drive bay;
    a processor located in the IHS chassis;
    a drive chassis located in the drive bay;
    a bezel extending from an edge of the drive chassis, wherein the bezel includes a bezel outer surface that is located adjacent the IHS outer surface when the drive chassis is located in the drive bay;
    a first connector coupling located on the bezel and accessible from the bezel outer surface; and
    an IHS connector located on the drive chassis and electrically coupled to the processor and the connector coupling.

8. The system of claim 7, wherein the drive chassis comprises an optical drive chassis.

9. The system of claim 8, wherein the optical drive chassis comprises a tray-load optical drive chassis.

10. The system of claim 8, wherein the optical drive chassis comprises a slot-load optical drive chassis.

11. The system of claim 7, wherein the drive chassis comprises a hard disk drive chassis.

12. The system of claim 7, wherein the first connector coupling comprises a Universal Serial Bus connector coupling.

13. The system of claim 7, wherein the first connector coupling comprises a High-Definition Multimedia Interface connector coupling.

14. The system of claim 7, further comprising:
a drive control located on the bezel.

15. The system of claim 7, further comprising:
at least one second connector coupling located on the bezel and electrically coupled to the IHS connector.

16. The system of claim 15, wherein the first connector coupling and the at least one second connector coupling comprises at least one Universal Serial Bus connector coupling and at least one High-Definition Multimedia Interface connector coupling.

17. A method for coupling a cable to an information handling system (IHS), comprising:
providing an IHS chassis defining an optical drive bay and including an IHS outer surface that defines an entrance to the optical drive bay, an optical drive chassis located in the drive bay, a bezel extending from an edge of the optical drive chassis and including a bezel outer surface that is substantially co-planar with the IHS outer surface when the drive chassis is located in the drive bay, and a first connector coupling located on the bezel and accessible from the bezel outer surface; and
coupling a first connector cable to the first connector coupling in order to couple a first device to a processor housed in the IHS chassis.

18. The method of claim 17, further comprising:
positioning an optical medium in the optical drive chassis.

19. The method of claim 17, further comprising:
providing at least one second connector coupling located on the bezel; and
coupling a second connector cable to the at least one second connector coupling in order to couple a second device to an IHS housed in the IHS chassis.

20. The method of claim 17, further comprising:
moving the optical drive chassis relative to the IHS chassis.

* * * * *